Dec. 15, 1953     S. N. GOLDMAN     2,662,775
CHILD SEAT FOR STORE SERVICE CARRIERS
Filed Sept. 15, 1950     2 Sheets-Sheet 1
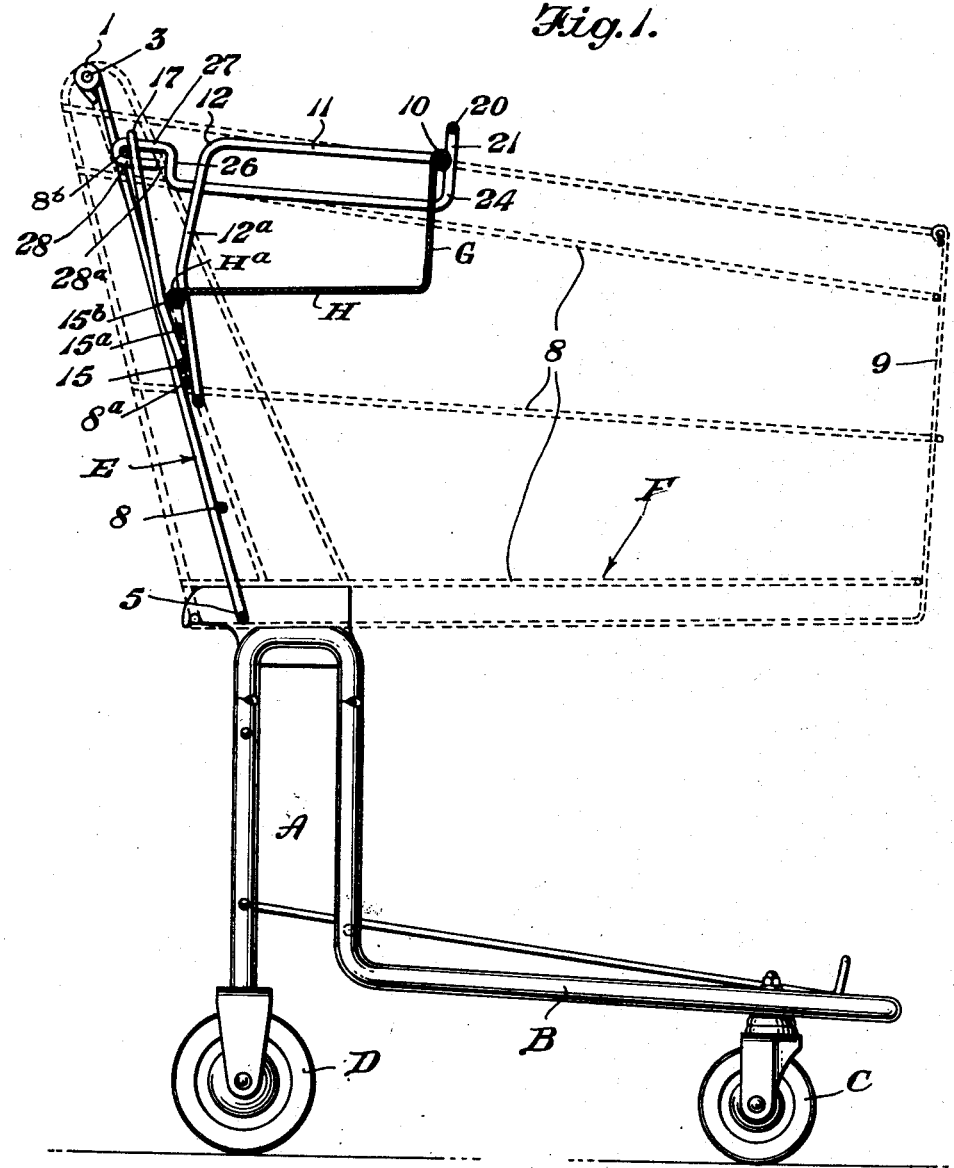
INVENTOR
Sylvan N. Goldman,
BY Ralph L. Barrett
ATTORNEY

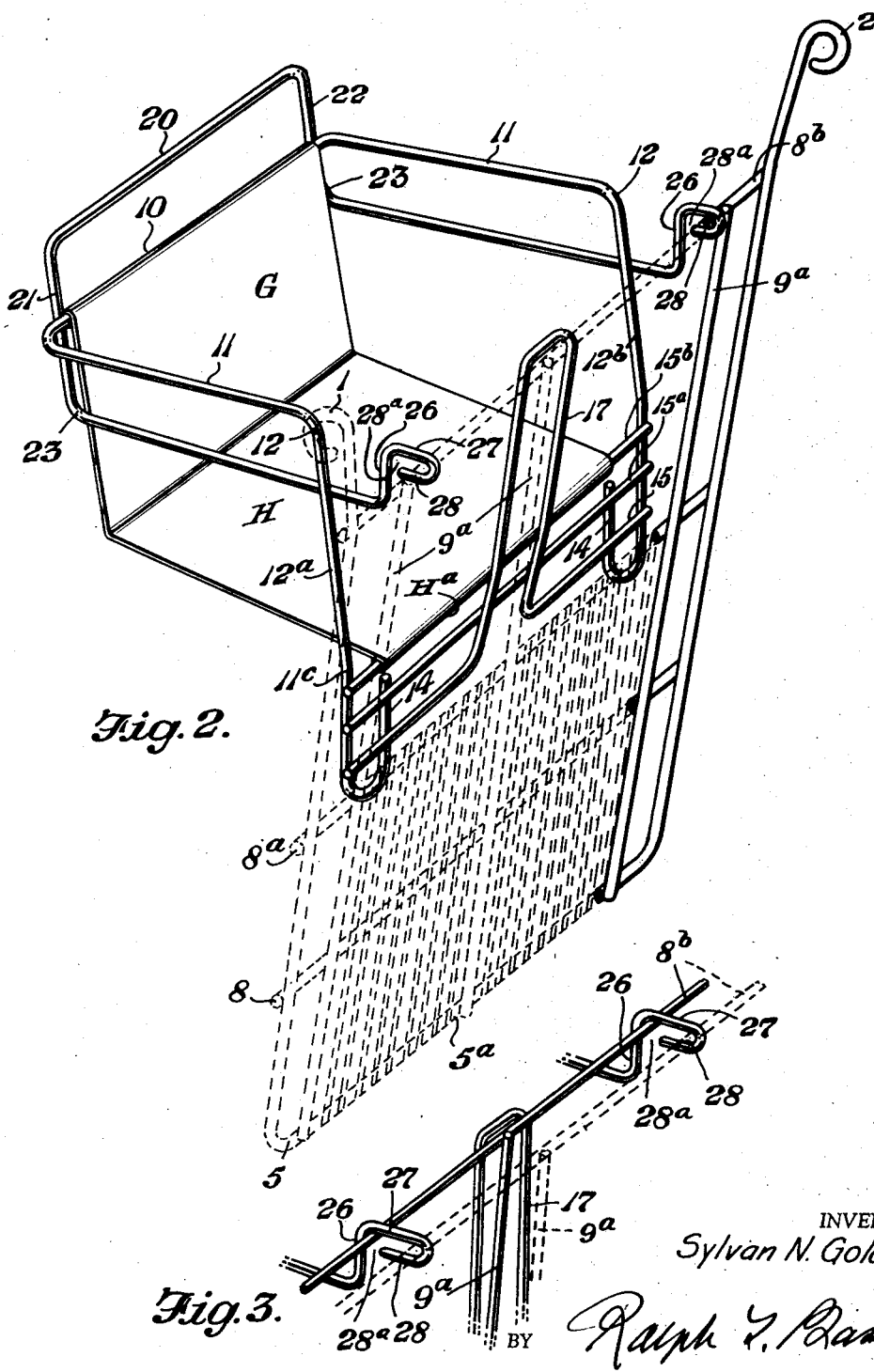

Patented Dec. 15, 1953

2,662,775

UNITED STATES PATENT OFFICE 2,662,775

CHILD SEAT FOR STORE SERVICE CARRIERS

Sylvan N. Goldman, Oklahoma City, Okla.

Application September 15, 1950, Serial No. 185,087

10 Claims. (Cl. 280—33.99)

This invention relates to improvements in child seats for store service carriers of the general type shown and described in my Letters Patent No. 2,508,670.

The primary object of this invention is to combine a swinging gate for telescoping baskets with a simple form of removable seat suitable for use by a child, whereby the child is positioned facing the customer using the structure with its lower extremities extending out through openings formed in the gate for that purpose.

One of the objects of this invention is to so construct the seat that the end portions of side arm members form elongated hooks which engage a cross rod element of the gate panel, these hooks being sprung into supporting engagement with the rod and so retained by a spring member at the front of the seat portion in such a manner that disengagement is prevented by the child due to the weight of the child tending to bias the parts toward a locking position.

Another object of the invention is to so construct the chair portion of the assembly that it will be sturdy in construction and yet be formed by the least possible number of parts which are constructed for relatively simple arrangement and assembly.

Other features will more clearly hereinafter appear by reference to the accompanying drawings and specification wherein like characters of reference designate corresponding parts throughout the several views, in which:

Fig. 1 is a side elevation of the invention with the store service carriage shown in part in dotted line.

Fig. 2 is a perspective view showing the chair and end gate, and

Fig. 3 is a fragmentary perspective view showing the gate and chair being assembled.

The store service cart illustrated in Fig. 1 is of that type shown in my prior application and embodies a tubular frame indicated generally by reference character A, and including the lower lading shelf B, front and rear supporting wheels C and D normally provided in transverse pairs, and forwardly swinging end gate E. The end gate E permits the telescoping of a forwardly tapered basket F of similar construction, this gate swinging upwardly on its hinges 1 and 2 shown in dotted line in Fig. 2, on the cross bar 3 of the basket, this cross bar 3 being either the handle of the assembly or a separate cross bar used in bracing of the basket or frame structure. The gate is shown as including a U-frame 5, the upper extremities of which are formed as hinge eyes 1 and 2 and which are coiled about the cross brace or handle 3 of the basket. The gate is fabricated to include the transverse stays or cross braces 8, 8a and 8b and the vertical stays 9, all of which are suitably spaced to provide a rigid structure in association with the heavier vertical spaced rods or wires 9a which terminate at their upper extremities at the cross stay 8b and at their lower end at the base of the U-frame indicated at 5a. This arrangement provides the upper openings through which a child's lower extremities may extend, the opening being defined medially by the central vertical stay 9a. The entire gate is welded at all points of intersection of the parts of the fabrication providing an extremely rigid assembly capable of absorbing the shock of impact occurring in the telescoping and separation of the carts in use.

The instant development includes with the gate structure aforesaid, a seat which can be readily positioned and removed, the seat including a wire frame and a seat and back portion illustrated as of sheet metal. The wire frame of the seat includes a U-shaped element forming a support for the upper marginal edge 10 of the sheet metal back G which is rolled thereabout, and arm portions 11, which are bent downwardly at 12 at a slight outward angle and terminate in inwardly facing hook like portions 14 formed by return bends to provide a series of spaced vertical braces to which the spaced cross rods 15, 15a and 15b are welded at points of intersection. The hooks formed by the return bends in the downwardly extending extremities of the arms 11 are of such length as to extend, when the seat is assembled on the gate, below the cross brace 8a to prevent the seat from swinging inwardly on its pivots beyond the plane of the gate. The cross rods 15, 15a and 15b besides having the function of partially closing the leg openings in the gate fabrication and preventing a child's legs from getting between the gate and chair, also separately provide other important features in the development.

The lower cross brace 15 is welded to the spaced hook portions and medially is bent upwardly to provide an elongated inwardly bent resilient clamp arm 17 which cooperates with anchor hooks hereinafter described to retain the same in position and permit assembly and disassembly. The clamp arm 17 is of sufficient length to lie against the inner face of the cross brace 8b of the gate structure when under tension and urges the hooks into positive engagement with this brace 8b which is the support upon which the seat is pivoted. The medial cross brace 15a is welded to the spaced arms of the hook element adjacent the upper free extremity of the latter while the upper cross brace 15b extends from points of the arms 11 immediately below the bends 11c and is otherwise not connected with any portion of the assembly, whereby it is free to accommodate the lower rolled edge H<sup>a</sup> of the seat H.

The seat back also includes another U-shaped frame member including the offset base 20, normally positioned above the offset base 10 of the companion element and the arms 21 and 22 of this frame member extend downwardly and forwardly as at 23 and 24 medially of the back G and below the arms 11 terminating forwardly of the downwardly extending shank portions 12a and 12b of same in the form of offset elongated rearwardly facing hooks. To form the hooks, the arms 23 are bent upwardly at 26 and forwardly at 27, with a spaced return bend 28 the latter terminating short of the upright portions 26 to permit the hook to be positioned over the wire cross brace 8b of the gate structure.

By means of the foregoing structure a chair for a child is provided, which in cooperation with a specially constructed swinging gate of a store service cart is capable of quick detachment to the gate, prevents displacement due to the novel structure and the action of the weight of a body contained therein, is of sanitary design, and is strong and durable.

It will be noted that basicly the invention is formed primarily of two U-shaped wires or rods, each of the U-shaped members having their base portions offset laterally, with the offset portions in both instances constituting portions of the back or back forming structure and the arms of the U-shaped members in both instances constituting the arms of the seat. The extremities of the two U-shaped frame members also have additional functions, the first U-shaped member having extremities offset to provide hooks which engage the cross brace or stay 8b of the gate to hinge the structure thereon and the extremities of the second U-shaped member constituting spaced braces for the front structure. The front structure includes three bars, the upper one of which 15b forms the anchor for the sheet metal seat surface while the lower one 15 is bent to provide an elongated clamping arm which cooperates with the hooks of the first U-shaped member to hold the latter in secured position. The locking of the structure is further brought about by a tendency of the assembly to bias with the hooks in engagement with the cross stay 8b when the weight of a child is in the seat. When the structure is to be removed it is slid towards the back of the seat to register the cross stay 8b with the openings 28a provided in the hooks, this sliding movement necessitating the displacement of the spring arm 17 which normally due to its inherent resiliency is biased against the face of the cross stay 8b opposed to that face which is engaged by the inner surfaces of the hooks. When the seat is in position a substantial portion of the openings formed in the gate structure between the cross rods 8a and 8b is closed by the transverse connection 15, 15a and 15b of the seat, this arrangement preventing the loss of material from the basket through that portion of the openings in the gate below the seating surface of the child's seat. It is to be understood that all intersecting portions of the main U-shaped frame elements are welded together at points of intersection and likewise the cross braces 15 and 15a are welded to space portions of the hooks 14 whereby an extremely rigid assembly is provided. Hook portion 17 of the cross brace 15 is not welded at any point in its length to any part of the structure in order that the added length of the structure may provide the proper resilience to the part to facilitate the latching and unlatching of the hooks on the cross brace or stay 8b.

It will be obvious to one skilled in the art that the basket otherwise constituted might be utilized in connection with the present invention, provided of course, the structure incorporates the openings, the cross bar 3 and proper suspension means by which the structure is to be swung at the open end of the basket assembly. One of the most important features obviously is the construction and arrangement of parts by means of which the baby seat is capable of such movement as may be required in the nesting of companion baskets. In the nesting or telescoping of store service carriers of the type disclosed in the present application, the forwardly tapered basket structure is such as to permit a substantial nesting operation by movement of a companion carrier through the swinging rear gate. Obviously this nesting operation moves the gate to an approximate horizontal position and by providing the present baby seat with the structure shown and claimed this seat is moved upwardly with the gate and does not in any way interfere with the telescoping of the baskets.

I claim:

1. In a store service carrier, having a forwardly tapered basket for telescoping association with a basket of similar construction, a hinged gate at one end of said basket, said gate having an opening at its upper end defined in part by spaced upper and lower frame members, a seat detachably connected by inwardly facing hook members to the upper frame member, said hook members engaging the outer face of said upper frame member, a resilient member extending upwardly from said seat and engaging the inner face of said upper frame member and normally urging said hooks into seating engagement with said frame member, and means depending from and extending below said seat for engagement with said lower frame member to support said seat against downward swinging movement on said hooks.

2. The structure of claim 1 characterized in that the seat includes a back portion of fabricated form, and the hooks are formed at the extremities of members directly connected to the back of the seat.

3. In a store service truck a receptacle supported thereby having an open end, a cross rod connecting the upper portion of the open end of said receptacle, a hinged gate mounted on said cross rod for closing the open end of said receptacle, said gate including a transverse stay, and a chair hingedly supported on said transverse stay and movable with said gate, said chair being formed of a pair of U-shaped structural units having their bases offset and lying in superimposed relation to constitute a supporting structure for the seat back, the legs of one of said U-shaped members projecting forwardly and downwardly and defining the arms and front of said seat, the other U-shaped member having its arms extending forwardly below the arms of the first U-shaped member and terminating in offset forwardly projecting elongated hooks, a rod connecting the downwardly extending portions of said first U-shaped member and having a resilient upward extension normally lying in a plane forward of the hook opening whereby said resilient arm may be sprung from its normal position to engage a side of the rod opposite to that engaged by the hooks when positioned thereon.

4. The structure according to claim 3 characterized in that a sheet metal seating surface extends between the base of one U-shaped member and is secured to a cross brace connecting the end portions of the first U-shaped member.

5. A seat attachment of the class described formed to include a pair of U-shaped frame members bent intermediate their ends to form offset base portions, the U-shaped frames being assembled with the inside angles of the bends of one U-shaped member facing the inside angles of the bends of the other U-shaped member, the offset portion of one of said frame members constituting arm portions with the connecting base portion thereof extending transversely at the rear of the seat, the end portions of said frame member depending downwardly and terminating below the seat, the offset portion of the other frame member defining upright and transverse portions of the back, with leg portions thereof extending forwardly of the back and defining portions of the arms, the extremities of the second frame member terminating in inwardly facing hooks, a rod connecting the depending portions of the first frame member, and a seat and back assembly connected to said rod and to the base of the first frame member.

6. The structure of claim 5 characterized in that a spring arm is mounted upon said depending portions of the first frame member and projects upwardly above the seat.

7. The structure of claim 5 characterized in that the depending portions of the first frame member are connected by a plurality of cross braces, one of which supports an upwardly extending spring arm.

8. The structure of claim 5 characterized in that the depending portions of the first frame member are connected by a plurality of cross braces, one of which is formed with a resilient vertical extension medially positioned with respect to the front of the seat.

9. In a store carrier including a swinging end gate mounted on a carrier part, said gate being formed with a transverse opening and including a transverse stay element adjacent its hinged portion, a baby seat suspended from the stay element and swingable on said stay element with and independently of said gate, said baby seat including a pair of U-shaped structural elements bent intermediate their ends to form offset base portions, the U-shaped structural elements being assembled with the inside angles of the bends of one U-shaped structural element facing the inside angles of the bends of the other U-shaped structural element, the offset portion of one of the structural elements forming the upper supporting frame of the back of said seat, and the extremity of said structural element terminating in inwardly facing open hooks for engaging said transverse stay element, the other U-shaped structural element having its base extending across and connecting the offset portion of the other structural element and including leg portions defining the arms of said seat, the last-named leg portions terminating in downwardly extending arms at each side of the seat structure, bars connecting said depending arms, a spring arm projecting upwardly medially of the seat structure from one of said bars for urging said hooks into seating engagement with said transverse stay element, and a body supporting portion connecting one of said bars and one of the base portions of said structural elements.

10. The structure of claim 9 characterized in that the spring arm projecting upwardly medially of the seat structure is formed as an offset integral portion of one of said bars.

SYLVAN N. GOLDMAN.

References Cited in the file of this patent

UNITED STATES PATENTS

| Number | Name | Date |
|---|---|---|
| 530,160 | Coulson | Dec. 4, 1894 |
| 547,102 | Williams | Oct. 1, 1895 |
| 556,951 | Williams | Mar. 24, 1896 |
| 2,508,670 | Goldman | May 23, 1950 |

FOREIGN PATENTS

| Number | Country | Date |
|---|---|---|
| 113,086 | Sweden | Jan. 30, 1945 |